United States Patent
Katou et al.

(10) Patent No.: US 9,407,051 B2
(45) Date of Patent: Aug. 2, 2016

(54) METHOD OF MANUFACTURING WATERPROOF INTERMEDIATE SPLICED PORTION OF WIRES AND WATERPROOF INTERMEDIATE UNIT OF WIRES

(75) Inventors: Takashi Katou, Yokkaichi (JP); Takehiko Tanaka, Yokkaichi (JP); Hiromichi Kawakita, Yokkaichi (JP); Yasuhiro Yoshida, Yokkaichi (JP); Tatsuya Kakuta, Yokkaichi (JP)

(73) Assignees: AUTONETWORKS TECHNOLOGIES, LTD., Yokkaichi, Mie (JP); SUMITOMO ELECTRIC INDUSTRIES, LTD., Osaka-shi, Osaka (JP); SUMITOMO WIRING SYSTEMS, LTD., Yokkaichi, Mie (JP)

( * ) Notice: Subject to any disclaimer, the term of this patent is extended or adjusted under 35 U.S.C. 154(b) by 194 days.

(21) Appl. No.: 13/816,782

(22) PCT Filed: Jun. 7, 2011

(86) PCT No.: PCT/JP2011/063068
§ 371 (c)(1),
(2), (4) Date: Feb. 13, 2013

(87) PCT Pub. No.: WO2012/042979
PCT Pub. Date: Apr. 5, 2012

(65) Prior Publication Data
US 2013/0175069 A1    Jul. 11, 2013

(30) Foreign Application Priority Data
Sep. 30, 2010    (JP) .................................. 2010-222003

(51) Int. Cl.
*H01R 43/20*    (2006.01)
*H01R 4/70*    (2006.01)
(Continued)

(52) U.S. Cl.
CPC .............. *H01R 43/20* (2013.01); *H01B 7/2825* (2013.01); *H01R 4/70* (2013.01); *H01R 43/005* (2013.01); *H02G 15/1813* (2013.01); *Y10T 29/49117* (2015.01)

(58) Field of Classification Search
USPC ............... 174/74 R, 78, 84 R, 92, 93; 156/49
See application file for complete search history.

(56) References Cited

U.S. PATENT DOCUMENTS 3,393,796 A * 7/1968 Clarke ............... B65D 75/5811
                                                        206/205
3,507,977 A * 4/1970 Pusey ...................... H01R 4/00
                                                        174/110 PM (Continued)

FOREIGN PATENT DOCUMENTS

JP    4-111110    9/1992
JP    11-196521    7/1999

(Continued)

OTHER PUBLICATIONS

International Search Report of Aug. 23, 2011.

*Primary Examiner* — William H Mayo, III
(74) *Attorney, Agent, or Firm* — Gerald E. Hespos; Michael J. Porco; Matthew T. Hespos

(57) ABSTRACT

A waterproof intermediate spliced portion of wires includes an intermediate spliced portion of the wires, waterproofing agent supplied to the intermediate spliced portion and cured, and a protective sheet for covering around the waterproofing agent supplied to the intermediate spliced portion. The protective sheet has flexibility capable of being deformed following the deformation of the surface of the waterproofing agent supplied to the intermediate spliced portion and covers the waterproofing agent in a state held in close contact with the surface of the waterproofing agent.

4 Claims, 12 Drawing Sheets

(51) Int. Cl.
*H01R 43/00* (2006.01)
*H02G 15/18* (2006.01)
*H01B 7/282* (2006.01)

(56) References Cited

U.S. PATENT DOCUMENTS

| | | | | |
|---|---|---|---|---|
| 3,879,575 | A | * | 4/1975 | Dobbin et al. .................. 174/92 |
| 4,648,919 | A | * | 3/1987 | Diaz .................... G02B 6/4476 |
| | | | | 156/48 |
| 4,818,310 | A | * | 4/1989 | McNeal ............... H02G 15/117 |
| | | | | 156/48 |
| 4,849,580 | A | * | 7/1989 | Reuter ........................ 174/92 |
| 4,880,962 | A | * | 11/1989 | Nolf et al. .................... 219/549 |
| 4,888,070 | A | * | 12/1989 | Clark et al. ..................... 156/48 |
| 4,954,670 | A | * | 9/1990 | Jensen et al. .................. 174/92 |
| 4,962,286 | A | * | 10/1990 | Jensen et al. .................. 174/92 |
| 5,316,789 | A | * | 5/1994 | Ookuma et al. ............... 427/117 |
| 5,399,810 | A | * | 3/1995 | Hayami ...................... 174/84 R |
| 6,303,865 | B1 | * | 10/2001 | Yamamoto et al. ......... 174/72 A |
| 7,572,979 | B2 | * | 8/2009 | Otsuki et al. ................ 174/84 R |
| 2004/0050575 | A1 | * | 3/2004 | Hershkowitz .................. 174/76 |

FOREIGN PATENT DOCUMENTS

| | | | | |
|---|---|---|---|---|
| JP | 2002-369328 | * | 12/2002 | ............... H02G 1/14 |
| JP | 2008-123712 | | 5/2008 | |
| JP | 2009-38953 | | 2/2009 | |
| JP | 2009-130981 | | 6/2009 | |
| JP | 2009-136039 | | 6/2009 | |
| JP | 2009-136039 A1 | * | 6/2009 | ............... H02G 1/14 |
| JP | 2010-153344 | | 7/2010 | |
| WO | 2005/104302 | | 11/2005 | |

* cited by examiner

METHOD OF MANUFACTURING WATERPROOF INTERMEDIATE SPLICED PORTION OF WIRES AND WATERPROOF INTERMEDIATE UNIT OF WIRES

BACKGROUND OF THE INVENTION

1. Field of the Invention

The present invention relates to a technology for waterproofing an intermediate spliced portion connecting wires.

2. Description of the Related Art

Conventionally, a technology disclosed in Japanese Unexamined Patent Publication No. H04-111110 or Japanese Unexamined Patent Publication No. 2009-136039 is known as a technology for waterproofing an intermediate spliced portion.

In Japanese Unexamined Patent Publication No. H04-111110, a resin case is mounted on a wire connected portion, an ultraviolet curable adhesive is filled into the resin case, and ultraviolet rays are irradiated from the outside of the resin case to cure the adhesive.

In Japanese Unexamined Patent Publication No. 2009-136039, a spliced portion and the like are placed on the upper surface of an insulating resin sheet to which an adhesive is applied, photo-curable silicone resin is applied thereto and, then, the insulating resin sheet is wounded around the spliced portion and the like. Thereafter, light is irradiated through openings at both ends of the wound insulating resin sheet to cure the photo-curable silicone resin and, then, the photo-curable silicone resin inside is allowed to naturally cure.

However, a waterproofing agent applied to the intermediate spliced portion shrinks or tries to enter between cores or wires until being cured after application. Thus, the volume of the waterproofing agent remaining on the surface of the intermediate spliced portion may decrease and the surface may be indented. In this case, a clearance is formed between the resin case and the cured adhesive in the case of Japanese Unexamined Patent Publication No. H04-111110. Also in the case of Japanese Unexamined Patent Publication No. 2009-136039, a clearance is formed between the insulating resin sheet and the cured photo-curable silicone resin since the insulating resin sheet having the adhesive applied thereto has a certain degree of shape retention. Once such a clearance is formed, it may become larger and the thickness of a waterproof part may become smaller. Further, liquid may be pooled in the clearance to deteriorate the waterproof part.

Accordingly, an object of the present invention is to suppress a clearance between a waterproofing agent supplied to an intermediate spliced portion and a protective sheet covering the waterproofing agent in waterproofing the intermediate spliced portion connecting wires.

SUMMARY OF THE INVENTION

To solve the above problem, the present invention is directed to a method of manufacturing a waterproof intermediate spliced portion of wires, comprising (a) a step of supplying a waterproofing agent to an intermediate spliced portion of wires; (b) a step of covering the waterproofing agent supplied to the intermediate spliced portion with a protective sheet; and (c) a step of curing the waterproofing agent while maintaining a state where the surface of the waterproofing agent and the protective sheet are held in close contact by deforming the protective sheet following the deformation of the surface of the waterproofing agent. Thus, a clearance between the waterproofing agent supplied to the intermediate spliced portion and the protective sheet covering the waterproofing agent can be suppressed in waterproofing the intermediate spliced portion connecting the wires.

The protective sheet preferably has flexibility capable of being deformed following the deformation of the surface of the waterproofing agent supplied to the intermediate spliced portion. Thus, a clearance between the waterproofing agent supplied to the intermediate spliced portion and the protective sheet covering the waterproofing agent can be suppressed.

The protective sheet may have self-adhesion. Thus, the covered state is maintained and operability is excellent.

The waterproofing agent may be photo-curable; the protective sheet may be capable of transmitting light for curing the waterproofing agent; and the waterproofing agent may be cured by irradiating light for curing the waterproofing agent. Thus, the waterproofing agent can be cured relatively quickly.

The waterproofing agent may be a photo-curable resin imparted with at least one of thermosetting property, moisture curing property, cationic polymerization curing property, anionic polymerization curing property and addition reaction curing property. Thus, the waterproofing agent can be cured even inside on which light is not incident.

The protective sheet may be wound around the waterproofing agent supplied to the intermediate spliced portion while a force is applied from outside. Thus, waterproofing can be provided more reliably between the wires since the waterproofing agent more easily enters between the wires.

The protective sheet may be wound around the waterproofing agent supplied to the intermediate spliced portion with tension applied to the protective sheet. Thus, the protective sheet can be wound with a force applied from outside by applying tension to the protective sheet.

The protective sheet may be wound around the waterproofing agent supplied to the intermediate spliced portion while being sandwiched by a pair of rollers. Thus, the protective sheet can be wound with a force applied from outside by a sandwiching force of the pair of rollers.

The protective sheet may be wound around the waterproofing agent supplied to the intermediate spliced portion and pulled out with outer parts overlapped and the waterproofing agent between overlapping parts may be pushed toward the intermediate spliced portion by ironing the overlapping parts of the protective sheet. Thus, the waterproofing agent can be desirably supplied to the intermediate spliced portion and waterproof performance is stabilized.

The invention also relates to a waterproof intermediate spliced portion of wires, comprising an intermediate spliced portion of wires; a waterproofing agent supplied to the intermediate spliced portion and cured; and a protective sheet having flexibility capable of being deformed following the deformation of the surface of the waterproofing agent supplied to the intermediate spliced portion and configured to cover the waterproofing agent in a state held in close contact with the surface of the waterproofing agent. Thus, a clearance between the waterproofing agent supplied to the intermediate spliced portion and the protective sheet covering the waterproofing agent can be suppressed in waterproofing the intermediate spliced portion connecting the wires.

The protective sheet of the waterproof intermediate spliced portion of wires may have self-adhesion properties. Thus, the covered state is maintained and operability is excellent.

The waterproof intermediate spliced portion of wires may use a waterproofing agent that is photo-curable; and the protective sheet is capable of transmitting light for curing the waterproofing agent. Thus, the waterproofing agent can be cured relatively quickly.

The waterproof intermediate spliced portion of wires may use a waterproofing agent that is a photo-curable resin imparted with at least one of thermosetting property, moisture curing property, cationic polymerization curing property, anionic polymerization curing property and addition reaction curing property. Thus, the waterproofing agent can be cured even inside on which light is not incident.

DETAILED DESCRIPTION OF THE PREFERRED EMBODIMENTS

Hereinafter, a method of manufacturing a waterproof intermediate spliced portion of wires and a waterproof intermediate spliced portion of wires according to an embodiment are described.

Figure 1:
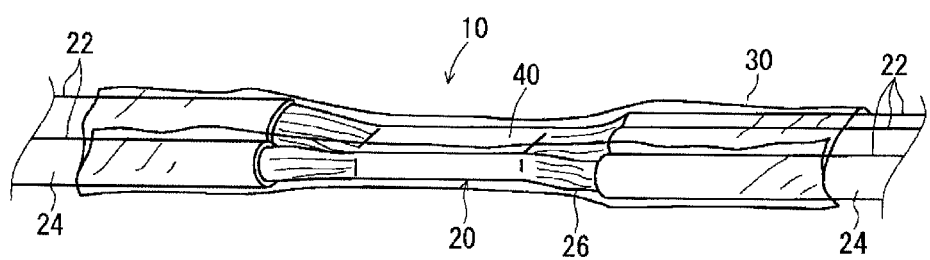
FIG. 1 is a perspective view showing a waterproof intermediate spliced portion of wires according to an embodiment.

First, the waterproof intermediate spliced portion of the wires is described. FIG. 1 is a perspective view showing a waterproof intermediate spliced portion 10 of wires. This waterproof intermediate spliced portion 10 of the wires includes an intermediate spliced portion 20 of the wires, a waterproofing agent 40 and a protective sheet 30.

The intermediate spliced portion 20 is formed by partially removing insulation coatings 24 of wires 22 in longitudinal intermediate parts to expose cores 26 and joining cores 26 of other wires 22 to the former cores 26. The cores 26 of the other wires 22 may be exposed in longitudinal central parts of the other wires 22 or may be exposed at end parts of the other wires 22. Here, the latter example is described. Further, there are a plurality of wires 22. The cores 26 are joined by resistance welding, ultrasonic welding, laser welding or crimping and connecting an intermediate crimping terminal.

The waterproofing agent 40 is supplied to spread around the intermediate spliced portion 20, particularly over the outer peripheral surfaces of the cores 26 exposed at the intermediate spliced portion 20 and the outer peripheral surfaces of the insulation coatings 24 before and after the cores 26 in the longitudinal direction of the wires 22. Particularly, the waterproofing agent 40 is preferably supplied to spread and fill between the insulation coatings 24 of a plurality of wires 22 at both longitudinal sides of the exposed cores 26. This waterproofing agent 40 is a liquid having sufficient fluidity to spread to each part of the intermediate spliced portion 20 and sufficient viscosity to maintain a supplied state as described above. The waterproofing agent 40 is cured after being supplied to the intermediate spliced portion 20.

Various curable resins which are liquids having fluidity and viscosity as described above and curable after being applied can be used as this waterproofing agent 40. Thermosetting resins such as epoxy resin and acrylic resin can be, for example, used as such curable resins. Further, moisture curable resins represented by moisture curable silicone can be, for example, used as the curable resins. Furthermore, photo-curable resins such as UV (ultraviolet) curable resins including a photoinitiator and mainly containing acrylate oligomer and acrylate monomer such as urethane acrylate, silicone acrylate and epoxy acrylate can be used as the curable resins. In terms of forming the waterproof intermediate spliced portion 10 by curing the waterproofing agent 40 in a short time, the use of a photo-curable resin (normally, UV curable resin) is preferable. In this embodiment, an example in which a UV curable resin is used as the waterproofing agent is described.

Further, the viscosity of the waterproofing agent 40 is preferably set in such a balanced viscosity region as to be difficult to laterally flow after the discharge of resin and flow upon receiving an external stress. For example, the viscosity is preferably in the range of 10 Pa·S to 100 Pa·S.

Since UV light irradiated from outside is blocked by a multitude of wires 22 in the case of forming the waterproof intermediate spliced portion 10 including the multitude of wires 22, the waterproofing agent 40 having entered between the wires 22 becomes a dark part in response to the irradiation of UV light. Accordingly, even in the case of using a UV curable resin, a UV curable resin having a property of being cured even if UV light is not incident is preferably used. At least one of other reactive curing properties such as thermosetting, moisture curing, cationic polymerization curing, anionic polymerization curing and addition reaction can be cited as a property of the UV curable resin besides UV curing. For example, it is preferable to use a UV curable resin obtained by adjusting the viscosity of a heat-curable and UV curable resin having a composition disclosed in Japanese Unexamined Patent Publication No. 2010-150517 to be higher. Further, it is also preferable to use a UV curable resin obtained by adjusting the viscosity of a thermosetting UV resin containing an amine compound of a (latent) thermosetting initiator and epoxy resin to be higher. Further, it is also possible to use a UV curable resin obtained by adjusting a UV curable resin reactive at normal temperature in mixing two liquids and disclosed in Japanese Unexamined Patent Publication No. 2010-154733 to be higher.

The protective sheet 30 covers at least the waterproofing agent 40 while being held in close contact with the surface of the waterproofing agent 40 supplied to the intermediate spliced portion 20 and cured. An example of a covering mode of the waterproofing agent 40 by this protective sheet 30 is described later. Further, this protective sheet 30 has sufficient flexibility to be deformable following the deformation of the surface of the waterproofing agent 40 supplied to the intermediate spliced portion 20. Specifically, the waterproofing agent 40 supplied to the intermediate spliced portion 20 shrinks or tries to enter between the exposed cores 26 or between the wires 22 until being cured. Thus, the surface of the waterproofing agent 40 may be indented as compared to a state immediately after the supply. In this case, the protective sheet 30 is convexly or concavely deformed following a shape change of the surface of the waterproofing agent 40. In this way, adhesion between the surface of the waterproofing agent 40 and the protective sheet 30 is maintained to suppress the formation of a clearance therebetween.

Further, the protective sheet 30 preferably has sufficient stretch property to be held in close contact with the outer peripheries of the intermediate spliced portion 20 and the waterproofing agent 40 when being wound around them.

Furthermore, the protective sheet 30 preferably has sufficient self-adhesion to be able to maintain the wound state while or after the protective sheet 30 is wound around the intermediate spliced portion 20 and the waterproofing agent 40. Here, the self-adhesion means a property of maintaining an overlapping and adhesive state (e.g. adhesive state capable of maintaining the wound state of the protective sheet 30 around the intermediate spliced portion 20) due to self-tackiness, bonding property or the like even in the absence of another adhesive, glue or the like if the protective sheet 30 is folded together. Specifically, wrap sheets of olefin-based resins such as polyethylene, polypropylene, polyvinyl chloride, polyvinylidene chloride and polyvinylidene fluoride or wrap sheets of general-purpose resins such as polyester, polyethylene terephthalate and nylon can be cited as the protective sheet 30. A sheet of polyvinyl chloride resin, polyvinylidene chloride resin or polyvinylidene fluoride resin having particularly good self-adhesion (tackiness) is preferable as the protective sheet 30. Further, even a resin sheet originally having poor self-adhesion can be applied as a so-called adhesive sheet by containing a suitable plasticizer or adhesive.

A desired rigidity property of the protective sheet 30 is that the shape of the protective sheet 30 flexibly changes in conformity with an object to be wrapped and the protective sheet 30 stretches to an appropriate extent since the object to be wrapped includes a viscous liquid and the protective sheet 30 needs to respond to surface shape deformation of the waterproofing agent 40 at the time of curing. A thin flexible sheet having a thickness of at least 200 μm or smaller, desirably the one having a thickness of 10 to 100 μm is preferably used. Desired Young's modulus (value at room temperature in a measurement direction in accordance with JIS-K7113) is in the range of 500 to 50 MPa when the thickness is as small as 10 to 50 μm and in the range of 50 to 10 MPa when the thickness is 50 to 100 μm. If the thickness is larger than 100 μm, Young's modulus (value at room temperature in the measurement direction in accordance with JIS-K7113) is preferably below 10 MPa. Further, the stretch of the sheet is at least 20% or more, preferably 50% or more and further preferably 100% or more. Concerning self-adhesion, a peel adhesive force is preferably in the range of 0.5 N/m to 10 N/m (value at room temperature obtained by a measurement method in accordance with JIS-Z0237). If a self-adhesive force is too weak, it is difficult to maintain the shape after wrapping and outside air enters. If the self-adhesive force is too strong, it becomes difficult to squeeze or press the wrap while holding the wrap in close contact with a resin liquid inside after wrapping and air remains in the wrap. Thus, the peel adhesive force is set in the above range to avoid these.

Further, in the case of using a photo-curable resin as the waterproofing agent 40, the protective sheet 30 is preferably capable of transmitting light for curing the waterproofing agent 40. That is, in the case of using a UV curable resin as the waterproofing agent 40, the protective sheet 30 preferably has high UV transmittance and is preferably thin. The UV transmittance of the protective sheet 30 is preferably, for example, 50% or higher, more preferably 90% or higher.

According to the waterproof intermediate spliced portion 10 of the wires thus configured, the waterproofing agent 40 is cured while the surface of the waterproofing agent 40 and the protective sheet 30 are kept in close contact by deforming the protective sheet 30 following the deformation of the surface of the waterproofing agent 40. Thus, a clearance between the waterproofing agent 40 supplied to the intermediate spliced portion 20 and cured and the protective sheet 30 covering that waterproofing agent 40 can be suppressed in waterproofing the intermediate spliced portion 20 connecting the wires 22. This can suppress a variation in the coating thickness of the waterproofing agent due to the formation of a clearance and make the coating thickness of the cured waterproofing agent 40 as uniform as possible. Further, liquid is unlikely to be pooled between the cured waterproofing agent 40 and the protective sheet 30, whereby the deterioration of this waterproof intermediate spliced portion 10 can be suppressed.

Further, if the protective sheet 30 has self-adhesion, the covered state is maintained when the protective sheet 30 covers the intermediate spliced portion 20 and the waterproofing agent 40 by being wound therearound. Thus, a winding operation and the like can be easily performed and operability is excellent.

In addition, the protective sheet 30 itself may be selected to have a suitable width in conformity with the shape of the intermediate spliced portion 20 and wound around the intermediate spliced portion 20 and the waterproofing agent 40. Thus, intermediate spliced portions 20 of various sizes can be easily dealt with, parts management becomes easier and management cost is reduced.

If a photo-curable resin is used as the waterproofing agent 40, the waterproofing agent 40 can be relatively quickly cured by irradiating light to the waterproofing agent 40 after the waterproofing agent 40 is supplied to the intermediate spliced portion 20 and the protective sheet 30 is wound. Thus, it is not necessary to leave the waterproofing agent 40 still and wait for a long time until the waterproofing agent 40 is cured. After the waterproofing agent 40 is supplied and the protective sheet 30 is wound, handling such as conveyance of the waterproof intermediate spliced portion 10 to the next process at a relatively early stage can be performed. In other words, even if the waterproof intermediate spliced portion 10 is moved at an early stage after the waterproofing agent 40 is supplied and the protective sheet 30 is wound, a situation where a filled state of the waterproofing agent 40 changes and waterproof performance is impaired can be suppressed.

The method of manufacturing the waterproof intermediate spliced portion 10 of the wires is described below. Note that, in the following description, the waterproofing agent 40 is a UV curable resin and the protective sheet 30 has appropriate flexibility, self-adhesion, stretch property, UV transmission property and the like. Of course, these properties are not necessarily essential if there is no problem in manufacturing.

Figure 2:
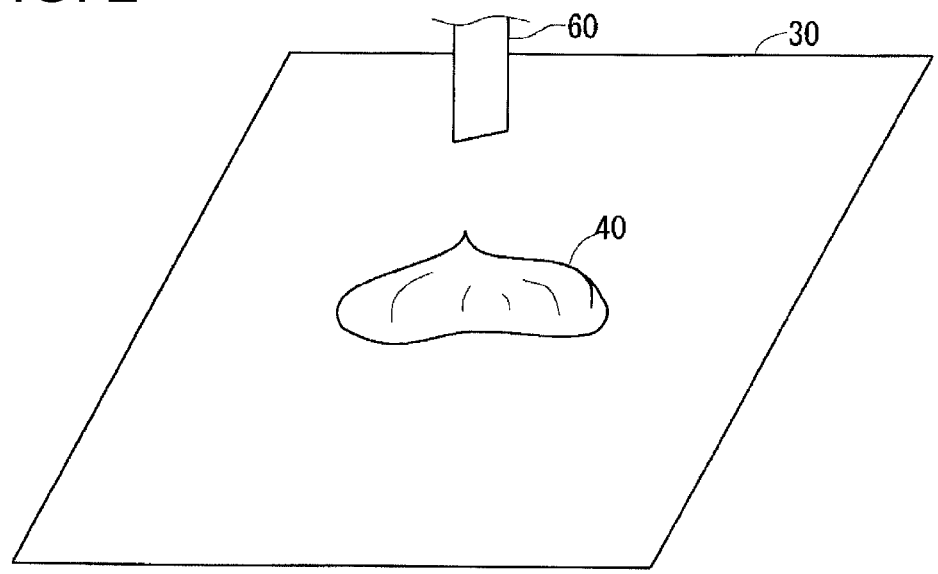
FIG. 2 is a view showing a method of manufacturing the waterproof intermediate spliced portion of the wires.

First, as shown in FIG. 2, the protective sheet 30 having a size sufficient to cover at least the intermediate spliced portion 20 is spread and the waterproofing agent 40 is supplied onto this protective sheet 30. The waterproofing agent 40 is preferably discharged to a central part of the protective sheet 30. A fixed amount of the waterproofing agent 40 is preferably discharged from a nozzle 60 of a discharging apparatus capable of discharging the fixed amount of the waterproofing agent 40.

Figure 3:
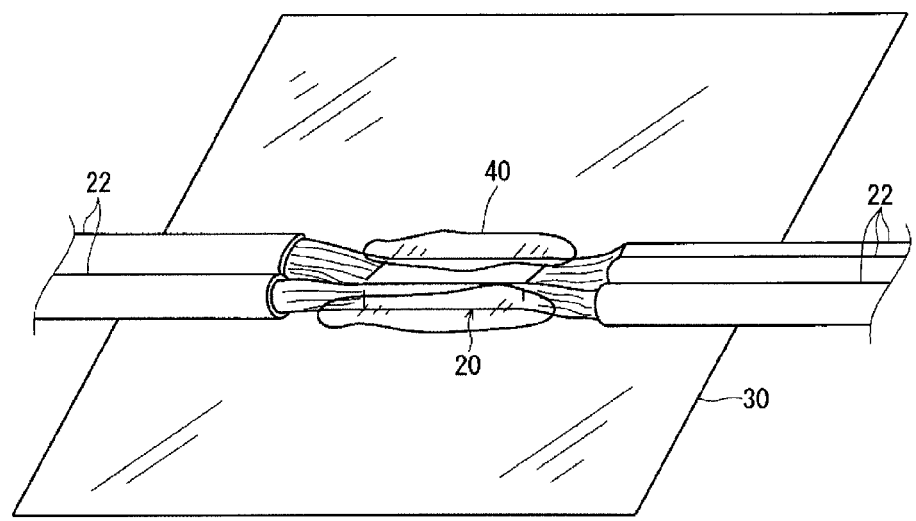
FIG. 3 is a view showing the method of manufacturing the waterproof intermediate spliced portion of the wires.

Subsequently, as shown in FIG. 3, the intermediate spliced portion 20 is placed on the waterproofing agent 40 discharged onto the protective sheet 30.

Figure 4:
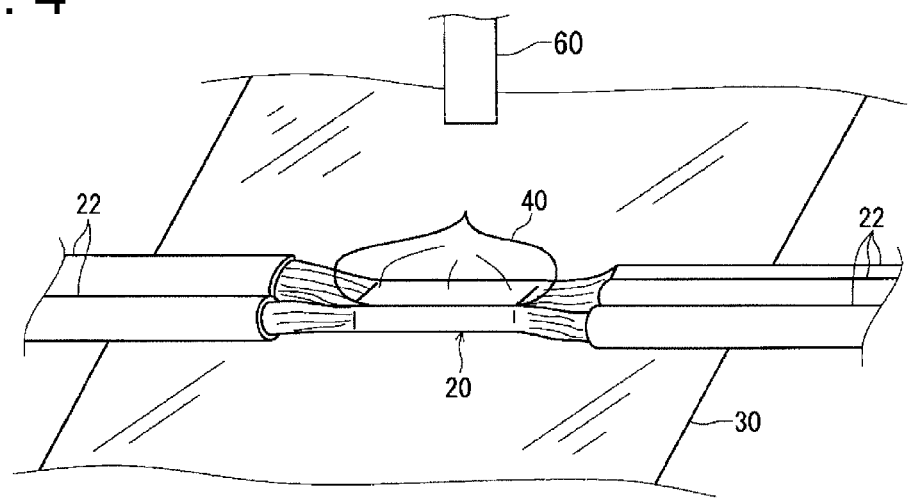
FIG. 4 is a view showing the method of manufacturing the waterproof intermediate spliced portion of the wires.

By an operation shown in FIGS. 2 and 3, the waterproofing agent 40 is supplied to the intermediate spliced portion 20 of the wires 22 (Step (a)). Of course, it is sufficient to supply the waterproofing agent 40 to the intermediate spliced portion 20 without being limited to the above example. For example, as shown in FIG. 4, the intermediate spliced portion 20 may be placed on the protective sheet 30 and the waterproofing agent 40 may be discharged onto the intermediate spliced portion 20 from the nozzle 60.

Figure 5:
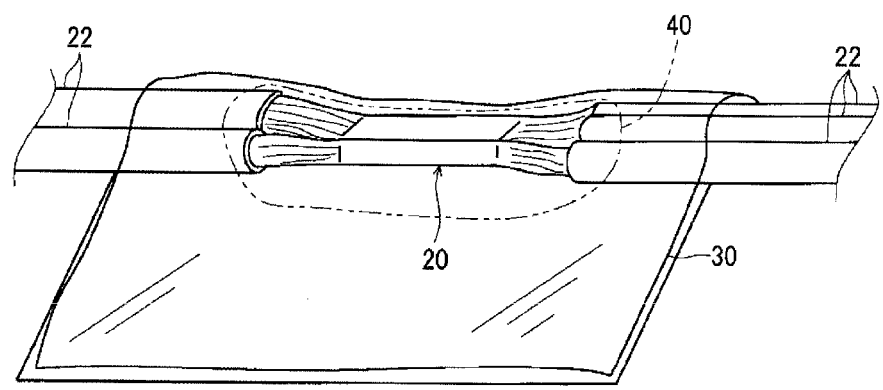
FIG. 5 is a view showing the method of manufacturing the waterproof intermediate spliced portion of the wires.
Figure 6:
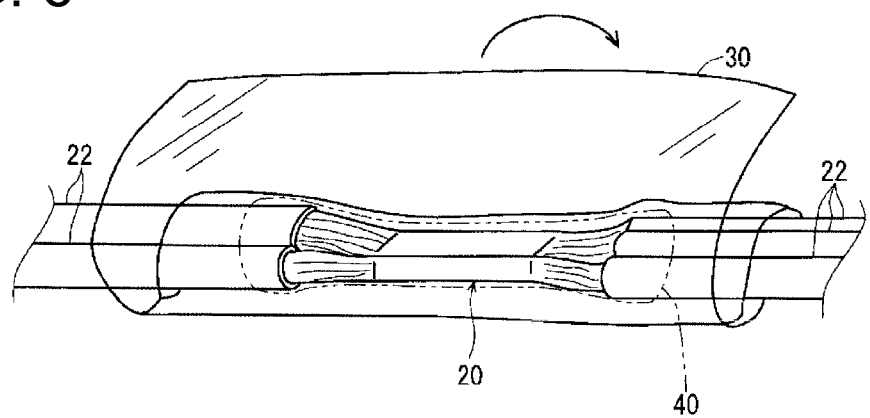
FIG. 6 is a view showing the method of manufacturing the waterproof intermediate spliced portion of the wires.

Subsequently, as shown in FIGS. 5 and 6, the intermediate spliced portion 20 and the waterproofing agent 40 supplied thereto are covered with the protective sheet 30 (Step (b)).

Here, as shown in FIG. 5, the protective sheet 30 is first folded into two, a middle part of the protective sheet 30 is wound around the intermediate spliced portion 20 and the waterproofing agent 40, and both end parts thereof are pulled outwardly in an overlapping state. Note that states of the overlapping parts of the protective sheet 30 are maintained by self-adhesion.

Figure 8:
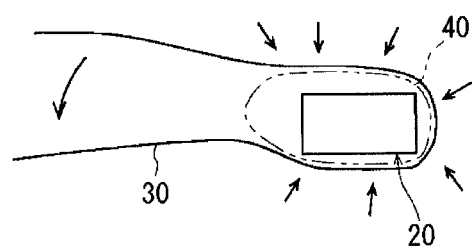
FIG. 8 is a view showing a state where a protective sheet is wound around a waterproofing agent supplied to the intermediate spliced portion while a force is applied from outside.

At this time, as shown in FIG. 8, the protective sheet 30 is preferably wound around the intermediate spliced portion 20 and the waterproofing agent 40 while a force is applied from outside. This is because the waterproofing agent 40 locally present around the outer periphery of the intermediate spliced portion 20 is pushed out to spread between an outer peripheral part of the intermediate spliced portion 20 and the protective sheet 30, thereby covering the entire outer periphery of the intermediate spliced portion 20, and the waterproofing agent 40 is also pushed to between the cores 26 and between the wires 22 to fill up clearances between them.

Figure 9:
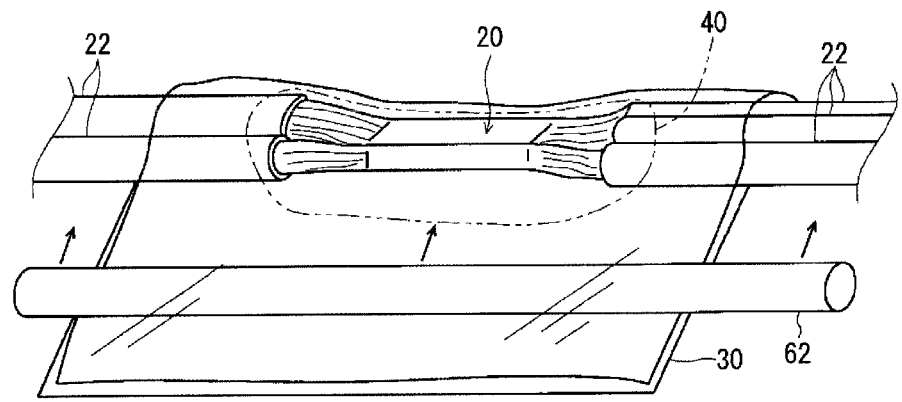
FIG. 9 is a view showing a state where overlapping parts of the protective sheet are ironed.
Figure 10:
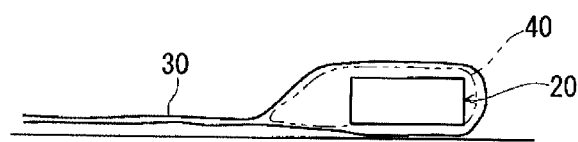
FIG. 10 is a view showing the state where the overlapping parts of the protective sheet are ironed.
Figure 11:
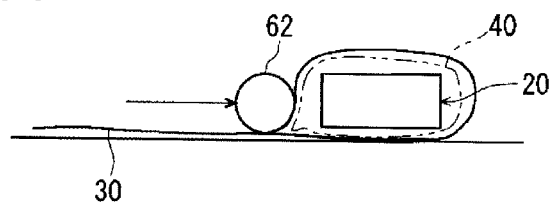
FIG. 11 is a view showing the state where the overlapping parts of the protective sheet are ironed.

After the protective sheet 30 is folded into two, the waterproofing agent 40 between the overlapping parts is preferably pushed toward the intermediate spliced portion 20 by ironing the overlapping parts of the protective sheet 30 as shown in FIGS. 9 to 11. Here, the overlapping parts of the protective sheet 30 are placed on a board and the overlapping parts are ironed by moving a round bar member 62 from end edges of the overlapping parts toward the intermediate spliced portion 20 while being sandwiched between the board and the round bar member 62, whereby the waterproofing agent 40 is pushed toward the intermediate spliced portion 20. At this time, trapped air bubbles can be allowed to escape to the outside of the waterproofing agent 40. In this way, the supplied waterproofing agent 40 more reliably comes to cover around the intermediate spliced portion 20.

After the protective sheet 30 is folded into two to cover the intermediate spliced portion 20 as described above, the overlapping parts of the protective sheet 30 are wound around the intermediate spliced portion 20 and the waterproofing agent 40 as shown in FIG. 6. The wound state is maintained by the self-adhesion of the protective sheet 30.

Figure 7:
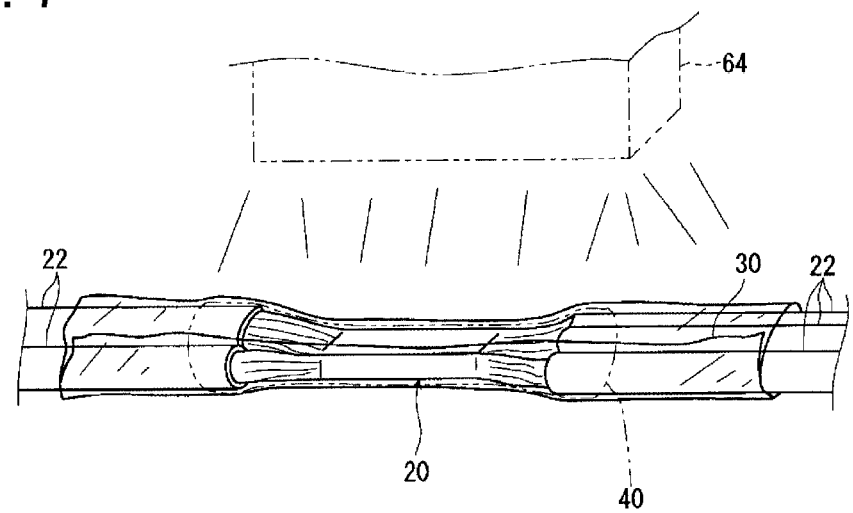
FIG. 7 is a view showing the method of manufacturing the waterproof intermediate spliced portion of the wires.
Figure 12:
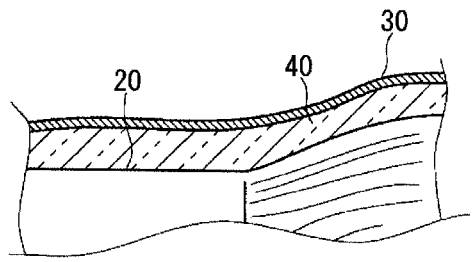
FIG. 12 is a view showing a state of the waterproofing agent and the protective sheet in curing the waterproofing agent.
Figure 13:
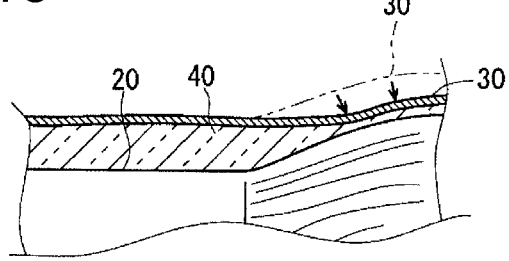
FIG. 13 is a view showing a state of the waterproofing agent and the protective sheet in curing the waterproofing agent.

Subsequently, as shown in FIG. 7, UV light from a UV light irradiating apparatus 64 is irradiated to the waterproofing agent 40 through the protective sheet 30. This causes the waterproofing agent 40 to be cured. Here, a state immediately after the protective sheet 30 is wound is shown in FIG. 12, and a state where the curing of the waterproofing agent 40 is advanced is shown in FIG. 13. As shown in FIGS. 12 and 13, the surface of the waterproofing agent 40 may be indented because the waterproofing agent 40 supplied to the intermediate spliced portion 20 shrinks or tries to enter between the exposed cores 26 or between the wires 22 until being cured or due to another factor. In this case, the above protective sheet 30 is convexly and concavely deformed following a shape change of the surface of the waterproofing agent 40 (see chain double-dashed line of FIG. 13). In this way, adhesion between the surface of the waterproofing agent 40 and the protective sheet 30 is maintained and the formation of a clearance between them is suppressed.

As described above, according to this method of manufacturing the waterproof intermediate spliced portion 10 of the wires, the waterproofing agent 40 is cured while the surface of the waterproofing agent 40 and the protective sheet 30 are kept in close contact by deforming the protective sheet 30 following the deformation of the surface of the waterproofing agent 40. Thus, a clearance between the waterproofing agent 40 supplied to the intermediate spliced portion 20 and the protective sheet 30 covering that waterproofing agent 40 can be suppressed in waterproofing the intermediate spliced portion 20 connecting the wires 22.

Further, since the protective sheet 30 has self-adhesion, if the protective sheet 30 covers the intermediate spliced portion 20 and the waterproofing agent 40 such as by being wounded therearound, this covered state is maintained, wherefore operability is excellent.

Further, since the protective sheet 30 is wound around the intermediate spliced portion 20 and the waterproofing agent 40 while a force is applied from outside, the waterproofing agent 40 is spread around and more easily enters between the wires 22. Therefore, waterproofing can be more reliably performed.

Furthermore, since the waterproofing agent 40 between the overlapping parts of the protective sheet 30 is pushed toward the intermediate spliced portion 20 by ironing these overlapping parts after the protective sheet 30 is folded into two, the supplied desired amount of the waterproofing agent 40 is concentrated around the intermediate spliced portion 20 and more easily enters between the wires 22. In this respect as well, waterproofing can be more reliably performed.

The above manufacturing method is described, focusing on the step of winding the protective sheet 30 around the intermediate spliced portion 20 and the waterproofing agent 40 while applying a force from outside.

First, in winding method example 1, the protective sheet 30 is wound around the intermediate spliced portion 20 and the waterproofing agent 40 supplied to the intermediate spliced portion 20 with tension applied to the protective sheet 30.

Figure 14:
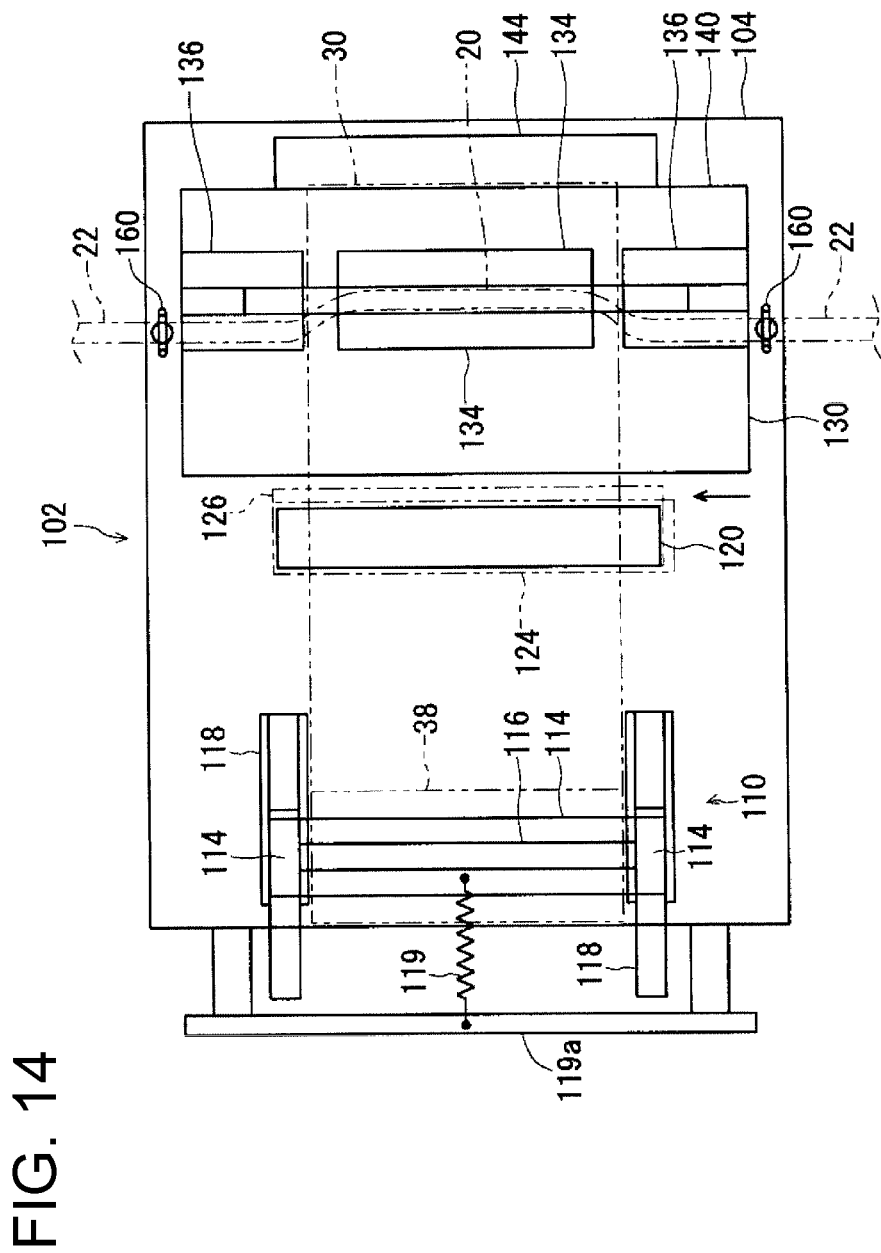
FIG. 14 is a plan view showing a winding apparatus.
Figure 15:
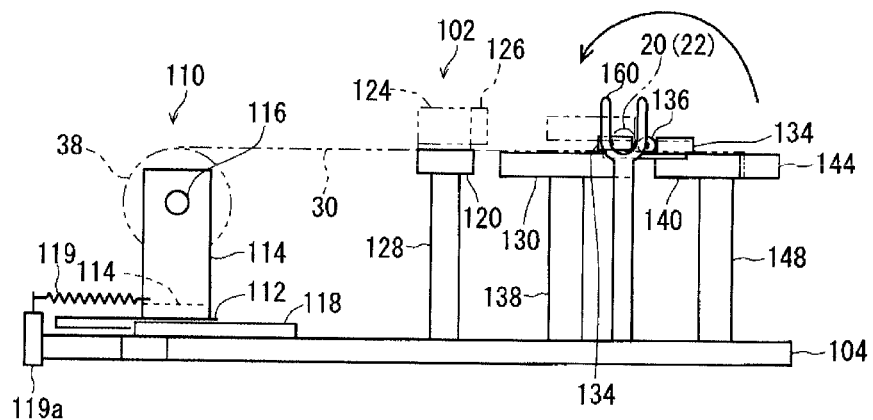
FIG. 15 is a side view showing the winding apparatus.

First, a winding apparatus 102 used in this winding method example 1 is described. FIG. 14 is a plan view showing the winding apparatus 102 and FIG. 15 is a side view showing the winding apparatus 102.

This winding apparatus 102 includes a sheet supply unit 110, an intermediate fixed table 120, a fixed table 130, a movable table 140 and wire fixing portions 160.

More specifically, the sheet supply unit 110, the intermediate fixed table 120, the fixed table 130 and the movable table 140 are linearly arranged side by side in this order. The intermediate fixed table 120, the fixed table 130 and the movable table 140 are arranged at the same height position and the protective sheet 30 supplied from the sheet supply unit 110 can also be supplied at the same height as the fixed table 130 as much as possible.

The fixed table 130 is in the form of a long plate having a length longer than the width of the protective sheet 30 and fixed onto a base 104 substantially in a horizontal posture via a leg portion 138.

The sheet supply unit 110 is provided at a position at a distance from one longer side of this fixed table 130. The sheet supply unit 110 is so configured that a pair of supporting plates 114 stand on a movable portion 112 and a supporting shaft 116 is supported substantially in a horizontal posture between the pair of supporting plates 114. The supporting shaft 116 is inserted through a protective sheet roll 38 in which the protective sheet 30 is wound and stored, whereby the protective sheet roll 38 is so supported that the protective sheet 30 can be pulled out. Further, the sheet supply unit 110 is supported movably toward and away from the fixed table 130 by sliders 118. Further, a coil spring 119 as a biasing member is mounted to be loaded between an extending portion 119a extending outward from the base 104 and the movable portion 112. The protective sheet roll 38 is biased in a direction away from the fixed table 130 by this coil spring 119.

Further, the intermediate fixed table 120 is supported on the base 104 by the leg portion 128 between the sheet supply unit 110 and the fixed table 130. A facing holding member 124 is detachably arranged on the intermediate fixed table 120. The facing holding member 124 is capable of supporting the protective sheet 30 by holding the protective sheet 30 between the intermediate fixed table 120 and the facing holding member 124 by the own weight thereof or a holding force utilizing a magnetic force acting between the facing holding member 124 and the intermediate fixed table 120.

Note that it is preferable that a clearance is provided between the intermediate fixed table 120 and the fixed table 130 to enable easy cutting of the protective sheet 30 in this clearance. In this case, a cutting mechanism 126 including a blade which can travel in the clearance is preferably provided on the facing holding member 124 or the like.

The movable table 140 is supported relative to the fixed table 130 via hinge portions 136 and can change its posture between a set posture horizontally continuous with the fixed table 130 and an overlapped posture which is attained by being rotated about a supporting shaft between the fixed table 130 and the movable table 140 where the movable table 140 is arranged to face the fixed table 130 from above. Note that a leg portion 148 below the movable table 140 functions to horizontally support the movable table 140 in the set posture. Note that the hinge portions 136 are located at both end parts between the fixed table 130 and the movable table 140 and slits are formed in middle parts thereof.

Further, a holding member 144 is detachably mounted to a side surface of the movable table 140 opposite to the fixed table 130. This holding member 144 is capable of supporting the protective sheet 30 by sandwiching the protective sheet 30 between the movable table 140 and the holding member 144 by a holding force utilizing a magnetic force or the like acting on the movable table 140.

Further, long elastic members 134 (e.g. sponges) are fixed to a lateral part of the upper surface of the fixed table 130 near the movable table 140 and a lateral part of the movable table 140 near the fixed table 130 by double-faced adhesive tapes or the like.

Further, the wire supporting portions 160 for supporting the wires 22 outwardly of the intermediated spliced portion 20 are provided on outward extensions of a part between the fixed table 130 and the movable table 140. Here, U-shaped jigs which are open upward are used as the wire supporting portions 160.

Figure 16:
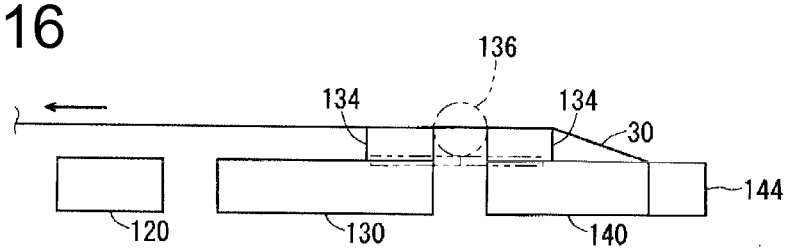
FIG. 16 is a view showing a winding operation by the winding apparatus.
Figure 17:
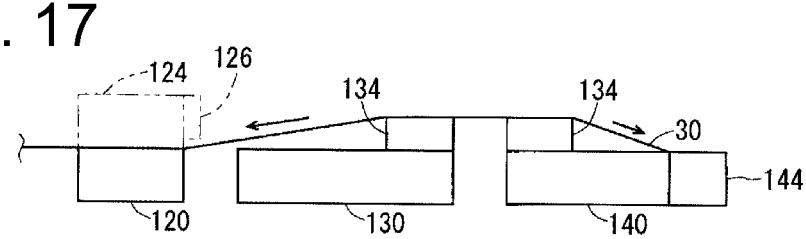
FIG. 17 is a view showing the winding operation by the winding apparatus.

An example of a winding operation using this winding apparatus 102 is described. First, the protective sheet 30 is pulled out from the sheet supply unit 110 and placed on the intermediate fixed table 120, the fixed table 130 and the movable table 140. In this state, the protective sheet 30 is held and fixed between the intermediate fixed table 120 and the facing holding member 124 and between the movable table 140 and the holding member 144. In this state, the protective sheet 30 is pulled between the intermediate fixed table 120 and the movable table 140. This pulled state is coupled with a force of the long elastic members 134 to lift the protective sheet 30 upward, whereby the protective sheet 30 is more reliably pulled (see FIGS. 16 and 17).

Figure 18:
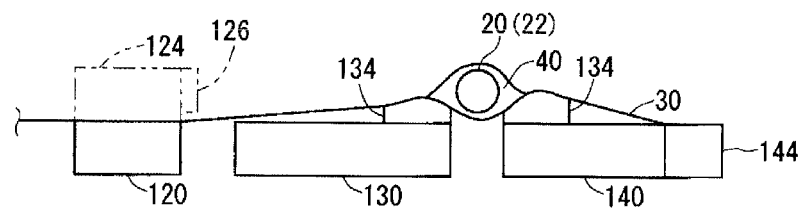
FIG. 18 is a view showing the winding operation by the winding apparatus.

Subsequently, the waterproofing agent 40 is supplied onto the protective sheet 30 and the intermediated spliced portion 20 is placed thereon at a position in a central part between the fixed table 130 and the movable table 140 (see FIG. 18). At this time, the wires 22 at both ends of the intermediated spliced portion 20 are supported at fixed positions by the wire supporting portions 160.

Figure 19:
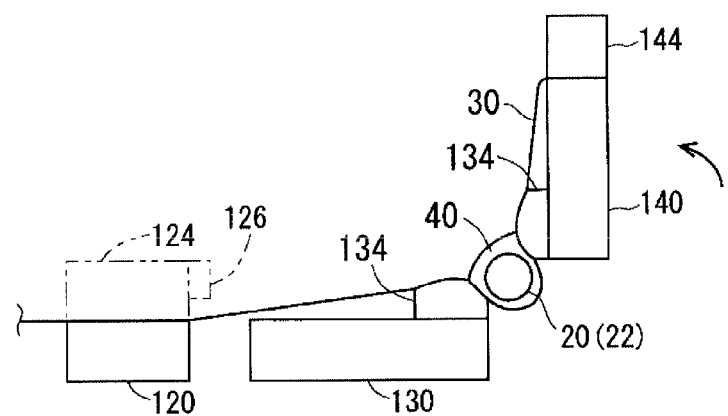
FIG. 19 is a view showing the winding operation by the winding apparatus.
Figure 20:
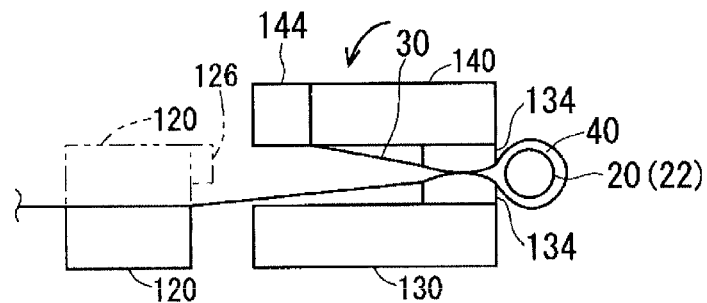
FIG. 20 is a view showing the winding operation by the winding apparatus.
Figure 21:
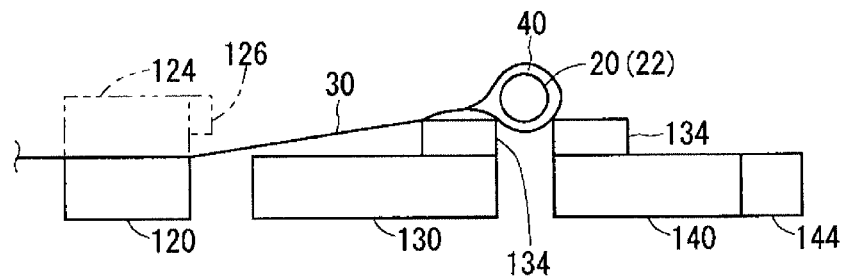
FIG. 21 is a view showing the winding operation by the winding apparatus.

Thereafter, the movable table 140 in the set position is rotated to be raised toward the fixed table 130. Then, the protective sheet 30 is folded into two and wound around the intermediated spliced portion 20 and the waterproofing agent 40 while the wires 22 are kept at fixed positions near extensions of axes of the hinge portions 136 (see FIGS. 19 and 20). At this time, since being pulled as described above in an initial state, the protective sheet 30 is pressed against the outer periphery of the intermediated spliced portion 20. Further, even in an intermediate state, the protective sheet 30 is wound around the intermediated spliced portion 20 and the waterproofing agent 40 while the both end parts of the protective sheet 30 are supported as described above and the wires 22 are kept at the fixed positions by the wire supporting portions 160. Thus, the protective sheet 30 is wound around the intermediated spliced portion 20 and the waterproofing agent 40 with tension still applied to the protective sheet 30.

When the movable table 140 is rotated up to the overlapped posture, extending parts of the protective sheet 30 are sandwiched between the pair of long elastic members 134. In this way, the protective sheet 30 is folded into two and wound around the intermediated spliced portion 20 and the waterproofing agent 40.

Thereafter, the waterproof intermediated spliced portion 10 can be manufactured in the same manner as described above.

In this way, the protective sheet 30 can be wound around the intermediated spliced portion 20 and the waterproofing agent 40 while a force is relatively easily applied from outside.

In winding method example 2, the protective sheet 30 is wound around the intermediated spliced portion 20 and the waterproofing agent 40 while being sandwiched between a pair of rollers.

Figure 22:
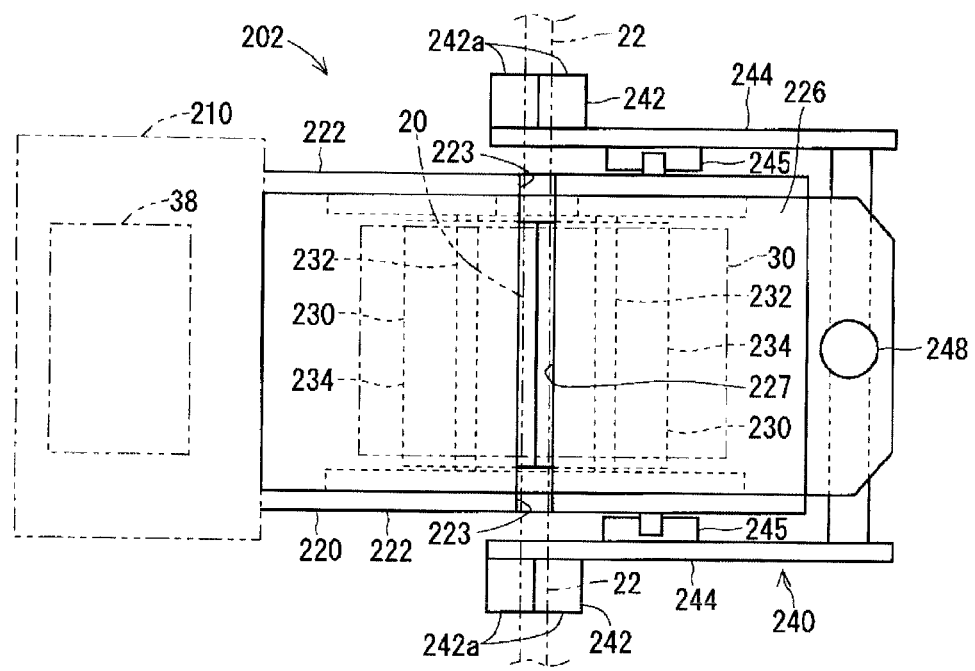
FIG. 22 is a plan view showing a winding apparatus.
Figure 23:
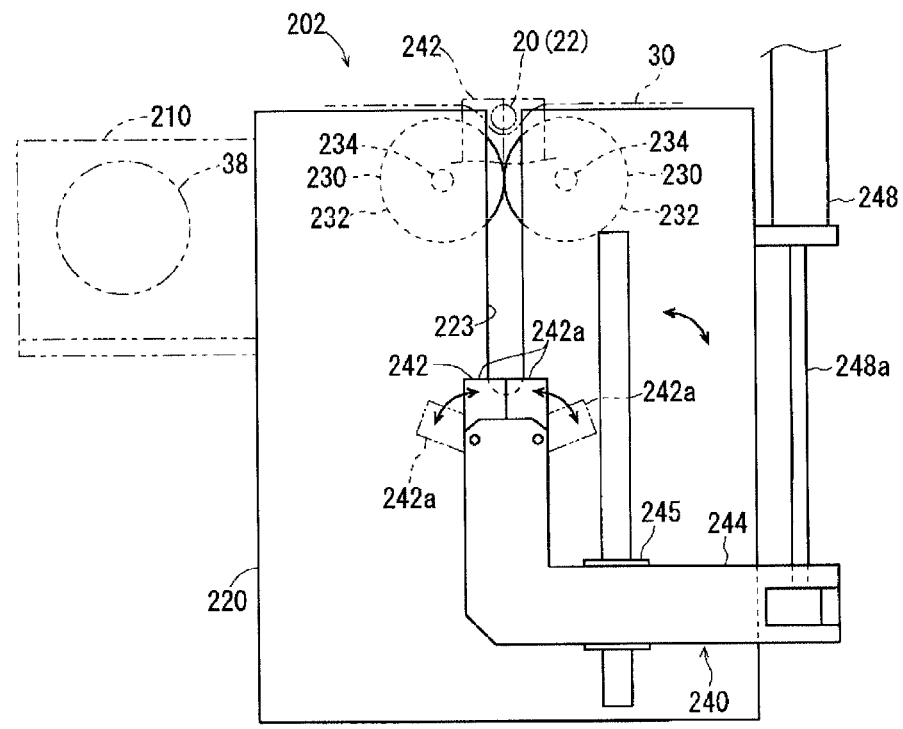
FIG. 23 is a side view showing the winding apparatus.

First, a winding apparatus 202 used in this winding method example 2 is described. FIG. 22 is a plan view showing the winding apparatus 202 and FIG. 23 is a side view showing the winding apparatus 202.

This winding apparatus 202 includes a sheet supply unit 210, a base 220, a pair of rollers 230 and a wire moving mechanism 240.

The base 220 includes a pair of side plate portions 222 and a ceiling plate portion 226. The ceiling plate portion 226 is formed with a slit-like opening 227 penetrating through both end parts of the ceiling plate portion 226. The pair of side plate portions 222 are formed with lateral grooves (here, bottomed grooves) which are open upward to be continuous with both end parts of the opening 227. The opening 227 and the lateral grooves 223 are formed to have such a width that the intermediated spliced portion 20 and a plurality of wires 22 are insertable.

The sheet supply unit 210 is provided at one side of the base 220. The sheet supply unit 210 is configured to be able to support a protective sheet roll 38 in which the protective sheet 30 is wound and stored. The protective sheet 30 supplied from this protective sheet roll can be pulled in a direction substantially orthogonal to the above opening 227 and placed on the ceiling plate portion 226.

The pair of rollers 230 are members, in each of which an elastic roller member 234 such as a sponge is arranged around a shaft portion 232, and provided at opposite sides of a space connecting the pair of lateral grooves 223 between the pair of side plate portions 222. Both end parts of the shaft portion 232 are rotatably supported on inner surface parts of the pair of side plate portions 222. Further, the pair of rollers 230 are arranged in contact with each other. When the wires 22 at both ends of the intermediate spliced portion 20 are moved downward along the pair of lateral grooves 223, the intermediate spliced portion 20 is sandwiched between the pair of rollers 230 and moves downward while rotating the pair of roller 230. The pair of rollers 230 need not necessarily be held in contact. Further, the pair of rollers 230 only have to have such elasticity that surface parts are elastically deformed in accordance with the peripheral shape of the intermediate spliced portion 20 to apply a force to this peripheral part.

The wire moving mechanism 240 includes wire gripping portions 242, intermediate supporting portions 244 and a driving portion 248.

The intermediate supporting portion 244 is formed into a substantially L-shaped member and movably supported on the outer surface of the side plate portion 222 by a guide member 245 while one end part is arranged along the lateral groove 223 and the other end part thereof extends laterally outwardly of the base 220 (toward an outer lateral side opposite to the sheet supply unit 210).

The wire gripping portion 242 includes a pair of gripping claws 242a and is configured to grip and release the wires 22 by a so-called electromagnetic chuck utilizing electromagnetic action. This wire gripping portion 242 is mounted to the one end part of the intermediate supporting portion 244 and movable upward and downward along the lateral groove 223 at an outer side of the lateral groove 223 as the wire gripping portion 242 is moved upward and downward.

The driving portion 248 is configured by a linear actuator such as an air cylinder or a hydraulic cylinder mounted at a side of the base 104 (side opposite to the sheet supply unit 210). This driving portion 248 includes a rod 248a which can be driven to move upward and downward, and this rod 248a is coupled to the other end parts of the intermediate supporting portions 244. The wire gripping portions 242 and the intermediate supporting portions 244 are driven to move upward and downward by driving the driving portion 248.

The wire gripping portions 242 and the driving portion 248 may be operated by a separately provided operation switch or may be controlled by a control controller.

Figure 24:
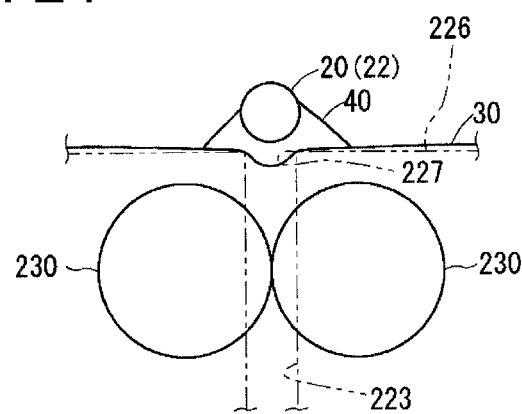
FIG. 24 is a view showing a winding operation by the winding apparatus.

An example of a winding operation using this winding apparatus 202 is described. First, after the protective sheet 30 is pulled out from the sheet supply unit 210 and cut to a predetermined length, the cut protective sheet 30 is placed on the ceiling plate portion 226. At this time, the opening 227 is arranged in a middle part of the protective sheet 30. Subsequently, the waterproofing agent 40 is supplied onto the protective sheet 30 and the intermediate spliced portion 20 is placed at the position of the opening 227 (see FIG. 24).

Figure 25:
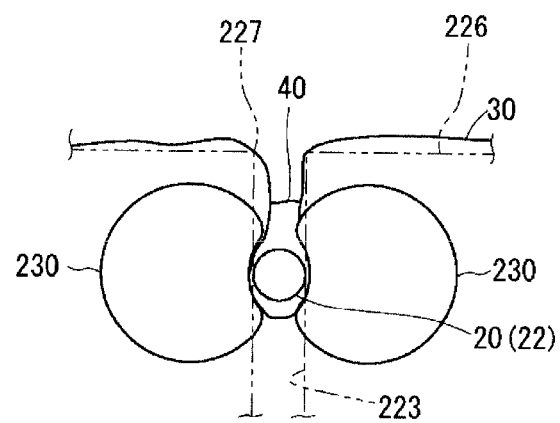
FIG. 25 is a view showing the winding operation by the winding apparatus.

Thereafter, the wires 22 are gripped between the pairs of gripping claws 242a at outward extension positions of the opening 227 by driving the wire gripping portions 242. Subsequently, the wires 22 are moved downward along the lateral grooves 223 by driving the driving portion 248. Then, the intermediate spliced portion 20 is sandwiched between the pair of rollers 230 while being sandwiched by the protective sheet 30 folded into two (see FIG. 25). At this time, the elastic roller members 234 sandwich the intermediate spliced portion 20, the waterproofing agent 40 and the protective sheet 30 while being elastically deformed in accordance with the shape of the peripheral part of the intermediate spliced portion 20. In this way, the protective sheet 30 is wound around the intermediate spliced portion 20 and the waterproofing agent 40 while a force is applied from outside.

Figure 26:
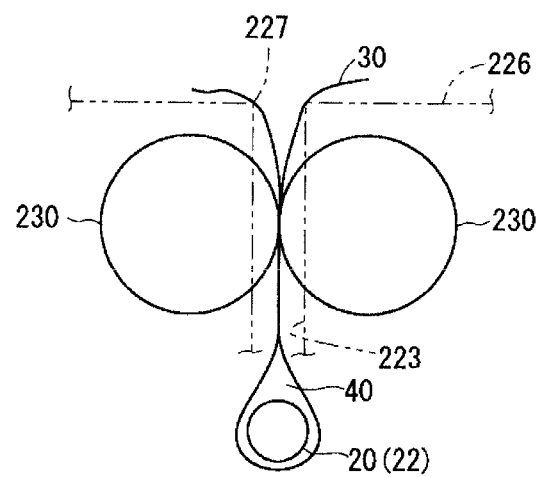
FIG. 26 is a view showing the winding operation by the winding apparatus.

When the peripheral part of the intermediate spliced portion 20 comes out downward from between the pair of rollers 230, the overlapping parts of the protective sheet 30 are sandwiched by the pair of rollers 230 (see FIG. 26).

Figure 27:
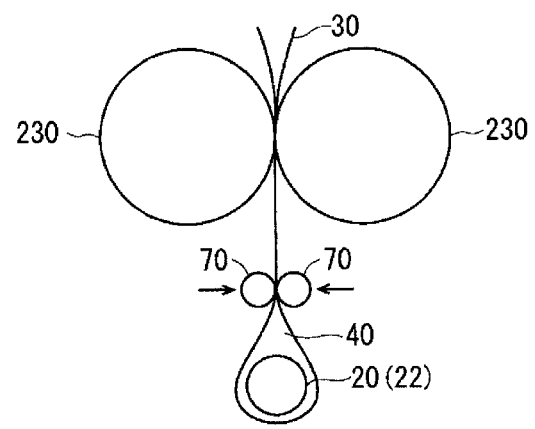
FIG. 27 is a view showing the winding operation by the winding apparatus.
Figure 28:
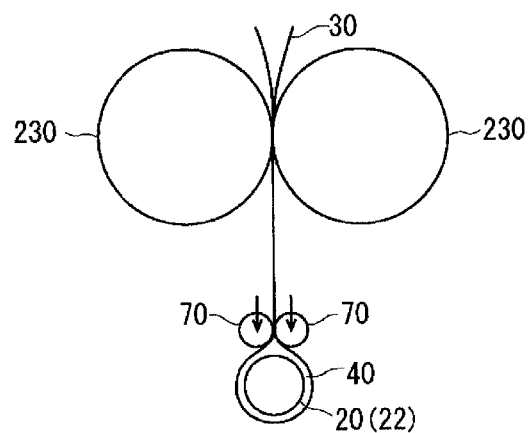
FIG. 28 is a view showing the winding operation by the winding apparatus.

Thereafter, as shown in FIGS. 27 and 28, the waterproofing agent 40 is preferably more reliably pushed toward the intermediate spliced portion 20 by moving a pair of bar-like members 70 for pushing the waterproofing agent 40 toward the intermediate spliced portion 20 in a state where the overlapping parts are sandwiched by the pair of bar-like members 70.

Thereafter, the waterproof intermediate spliced portion 10 can be manufactured in the same manner as described above.

In this way, the protective sheet 30 can be wound around the intermediated spliced portion 20 and the waterproofing agent 40 while a force is relatively easily applied from outside.

Note that, in this example, the intermediate spliced portion 20 may be passed between the pair of rollers 230 with the both end parts of the protective sheet 30 pulled with a certain level of force.

Note that the respective configurations described in the above respective embodiments and modifications can be appropriately combined unless they contradict each other.

Although this invention has been described in detail above, the above description is illustrative in every aspect and this invention is not limited thereto. It should be appreciated that unillustrated numerous modifications can be made without departing from the scope of this invention.

The invention claimed is:

1. A waterproof intermediate spliced unit, comprising:
a plurality of wires, each of the wires having a conductive core and first and second spaced apart areas of insulation coating circumferentially surrounding the core, so that each of the wires has an exposed area of the conductive core between the first and second longitudinally spaced areas of insulation coating of the respective wire, the exposed areas of the wires being adjacent one another and in electrical contact with one another to define an intermediate spliced portion of the wires;
a photo-curable waterproofing agent supplied to the exposed conductive cores at the intermediate spliced portion; and a deformable protective sheet formed from a material having a UV transmittance of at least 50%, the protective sheet being wound around the exposed areas of the conductive cores of the wires and around longitudinal sections of the first and second longitudinally spaced areas of insulation coating adjacent to the exposed areas of the conductive cores, the deformable protective sheet being pressed sufficiently for following deformations of a surface of the waterproofing agent supplied to the intermediate spliced portion and for urging air bubbles from the waterproofing agent in the intermediate spliced portion and holding the protective sheet in close contact with the surface of the waterproofing agent, the waterproofing agent inward of the protective sheet and surrounding the exposed areas of the conductive cores of the wires and around longitudinal sections of the first and second longitudinally spaced areas of insulation coating adjacent to the exposed areas of the conductive cores being photo-cured.

2. A waterproof intermediate spliced portion of wires according to claim 1, wherein:

the protective sheet is a protective sheet having self-adhesion.

3. A waterproof intermediate spliced portion of wires according to claim 1, wherein:

the waterproofing agent is a photo-curable resin imparted with at least one of thermosetting property, moisture curing property, cationic polymerization curing property, anionic polymerization curing property and addition reaction curing property.

4. The waterproof intermediate spliced portion of wires according to claim 1, wherein the deformable protective sheet is formed from a material having a UV transmittance of at least 90%.

* * * * *